United States Patent [19]

Rogers

[11] Patent Number: 4,592,387
[45] Date of Patent: Jun. 3, 1986

[54] POWER-ASSISTED COUPLING
[75] Inventor: Russell L. Rogers, Munith, Mich.
[73] Assignee: Aeroquip Corporation, Jackson, Mich.
[21] Appl. No.: 774,034
[22] Filed: Sep. 9, 1985
[51] Int. Cl.⁴ .............................................. F16L 37/28
[52] U.S. Cl. ........................... 137/614.06; 137/614.05; 285/306
[58] Field of Search ....................... 137/614.05, 614.06, 137/614.04; 285/306, 312, 316

[56] References Cited
U.S. PATENT DOCUMENTS

| | | | |
|---|---|---|---|
| 3,646,964 | 3/1972 | Stratman | 137/614.03 |
| 3,710,823 | 1/1973 | Vik | 137/614.06 |
| 4,009,729 | 3/1977 | Vik | 137/614.05 |
| 4,222,411 | 9/1980 | Herzan et al. | 137/614.04 |
| 4,303,098 | 12/1981 | Shindelar | 137/614.06 |
| 4,540,021 | 9/1985 | Rogers | 137/614.05 |

Primary Examiner—A. Michael Chambers
Attorney, Agent, or Firm—Beaman & Beaman

[57] ABSTRACT

A manually operated, power-assisted, self-sealing fluid coupling which utilizes pressurized fluid to interconnect the coupling parts. A sleeve within one part selectively locks to the other part and utilizes an expansible chamber motor to draw the other part into the one coupling part, and a second expansible chamber motor associated with the sleeve neutralizes the coupling force of the first motor during disconnection and manual operation of the sleeve through a valve component disconnects the coupling parts.

8 Claims, 5 Drawing Figures

POWER-ASSISTED COUPLING

BACKGROUND OF THE INVENTION

Fluid couplings utilizing self-sealing valves within the coupling halves or parts permit two fluid circuits to be connected and disconnected while one or both of the circuits are pressurized without significant loss of fluid. The self-sealing valves usually engage during the final stage of connection of the coupling parts and displace each other to an open condition establishing communication between the respective fluid circuits. During disconnection separation of the self-sealing valves permits automatic closure to seal the passage of each part.

When connecting self-sealing coupling parts, the forces imposed on the self-sealing valves by the associated pressurized fluid must be overcome, and the "piston" effect of a self-sealing valve exposed to pressurized fluid may render it difficult to fully couple the parts. Coupling is particularly difficult to achieve if both of the coupling parts are pressurized wherein fluid pressure is acting upon both of the self-sealing valves and must be overcome when connecting the parts to completion.

Fluid couplings used with agricultural equipment, such as those mounted upon tractors, are used to supply pressurized hydraulic fluid to implements hitched to the tractor, and such couplings must be readily connected and disconnected, self-sealing, and of the "breakaway" type wherein the coupling parts may automatically separate when the axial tension in the hose lines of the implement reaches a predetermined force. In agricultural equipment couplings it is not uncommon for pressurized fluid to exist within each coupling part, one of the parts pressurized by the tractor hydraulic system, the other part being pressurized due to the weight of the implement hydraulically operated components, and commonly, agricultural couplings often use manual actuators to assist in the coupling operation.

Fluid self-sealing couplings using manual actuators are known, and typical coupling constructions are shown in U.S. Pat. Nos. 3,710,823; 4,009,729 and 4,222,411. Also, it is known to incorporate power-assisted features into self-sealing fluid couplings to aid connection of the coupling parts while under pressure, and examples of such devices are shown in U.S. Pat. Nos. 3,646,964; 4,303,098 and in the assignee's U.S. Pat. No. 4,540,021.

While some of the problems of interconnecting self-sealing fluid couplings under pressure are met by the prior art devices disclosed in the aforementioned patents, the cost of producing such couplings is high, and such prior art devices do not overcome all of the problems existing with this type of coupling.

It is an object of the invention to provide a self-sealing fluid coupling utilizing a manually operated actuator wherein the coupling incorporates structure permitting pressurized fluid to be utilized in achieving the coupling connection.

It is another object of the invention to provide a self-sealing coupling employing a manual actuator to initiate connection and disconnection of the coupling parts wherein only small forces need be imposed upon the manual actuator to achieve the coupling operation even though one or both of the coupling parts may be under pressure.

Yet another object of the invention is to provide a self-sealing power-assisted fluid coupling having a manual actuator wherein coupling of the parts is achieved by forces resulting from the supply of pressurized fluid and disconnection of the coupling parts is readily achieved.

A further object of the invention is to provide a self-sealing coupling employing a manual actuator wherein the actuator operates a valve component controlling pressurized fluid pressure to permit a power-operated connection of the coupling parts, the power-assisted connection being accomplished through an expansible chamber motor concisely defined in one of the coupling parts, and a second expansible chamber motor being utilized to neutralize the effect of the first motor to permit manual operation of the actuator in the disconnection operation with little exertion.

Yet a further object of the invention is to provide a self-sealing fluid coupling of the power-assisted type wherein the coupling parts will automatically disconnect upon excessive tension forces being applied thereto to prevent damage to the associated conduits and hose line.

In the practice of the invention the coupling female part includes a passage connected to the pressurized fluid supply and the outer end of the passage is closed by a spring biased self-sealing valve arrangement. An annular sleeve is mounted upon the female part for axial displacement thereon between extended and retracted positions, and the sleeve includes an open outer end which extends beyond the female part self-sealing coupling for receiving the nose of the male part. Radially displaceable detents in the form of balls are mounted upon the outer end of the sleeve for cooperation with a groove formed in the male part nose, and the female part includes a detent operating actuator which locks the male part to the sleeve as the sleeve is retracted into the female part.

The portion of the female part circumscribed by the sleeve includes a radial shoulder which defines opposed radial surfaces on opposite sides thereof, and the shoulder includes a seal engaging an inner cylindrical sleeve surface. The sleeve includes radial annular surfaces in opposed relationship to the female part shoulder surfaces, and as the sleeve is axially displaced on the female part first and second annular expansible motor chambers are defined by the radial sleeve and shoulder surfaces upon opposite axial sides of the shoulder.

The sleeve includes an outer cylindrical diameter, and an annular axially displaceable control valve encompasses the sleeve cylindrical diameter and includes a pair of axially spaced seals engaging the sleeve. A radial clearance exists between the sleeve outer diameter and the valve inner diameter and this clearance forms a portion of a fluid circuit interconnecting the first and second expansible motor chambers defined by the female part shoulder and sleeve radial surfaces.

A passage in the female part establishes communication between the side of the female part shoulder remote from the sleeve open end, and a second passage defined in the sleeve establishes communication between the first sleeve chamber and the control valve clearance. A third passage interconnects the clearance between the sleeve and control valve with the sleeve chamber disposed on the side of the female part shoulder toward the sleeve outer end. The effective areas of the pressure faces defined on the sleeve in the first and second expansible motor chambers for producing axial forces on the sleeve are substantially equal.

A manual actuator is rotatably mounted upon the female part by means of a hand-operated lever, and the actuator includes a hub having an eccentrically located pin received within an annular groove defined on the control valve. Thus, rotation of the actuator produces an axial displacement of the valve on the sleeve.

In the disconnected state the actuator will be rotated to a position which shifts the valve toward the female part open end and the valve includes an end which abuts a snap ring on the sleeve which axially displaces the sleeve its maximum extent toward the open end of the female part. In this position, the detent actuator releases the detents and permits the nose of the male coupling part to be inserted into the sleeve open end for a sealed relationship thereto.

Upon the male part being fully inserted into the sleeve open end the manual actuator is rotated to displace the valve in an axial direction away from the female part open end, and this valve movement positions the valve seals on the sleeve such to close the second chamber with respect to the pressurized fluid within the female part and permit exhausting of the second chamber. Simultaneously, the first sleeve chamber will continue to be exposed to the pressurized fluid within the female part, and the first chamber produces an axial force on the sleeve which retracts the sleeve into the female part drawing the male part therein, and the detent acutator causes the detents to grip the male part locking the male part to the sleeve. As the male part is drawn into the female part by the pressure within the sleeve first chamber, the engagement of the parts' self-sealing valves may open one, or both, of the self-sealing valves prior to the parts being fully coupled, but as the area of the end of the male part exposed to pressurized fluid is of a lesser area than the pressure face area of the first chamber, retraction of the sleeve and male part will continue until the coupling parts are fully connected.

When disconnecting the coupling parts the manual actuator is rotated to a position which shifts the valve on the sleeve establishing communication between the pressurized fluid within the female part and the shoulder and sleeve surfaces defining the pressure faces of the second sleeve chamber. This movement of the control valve terminates the exhausting of the second chamber and pressurizes the second chamber, and as equal pressure now exists within the first and second sleeve chambers, the substantially equal faces of these chambers will counterbalance or neutralize the biasing force imposed on the sleeve by the fluid within the first chamber and continued rotation of the manual actuator displaces the valve for engagement with the sleeve shifting the sleeve toward the female part open end and at the extreme extension of the sleeve the detent actuator releases the detents permitting the male part to be removed from the sleeve. Very little force is required to be exerted on the manual actuator during disconnection of the coupling parts, and during the initial stages of disconnect, fluid force acting upon the male part end aids in the extension of the sleeve.

If, while the parts are coupled, high tension forces are imposed upon the male and female parts, upon such tension overcoming the biasing force imposed on the sleeve by the first chamber the sleeve is displaced toward the female part open end to the fully disconnect position which permits the detent actuator to release the detents freeing the male part from the sleeve.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
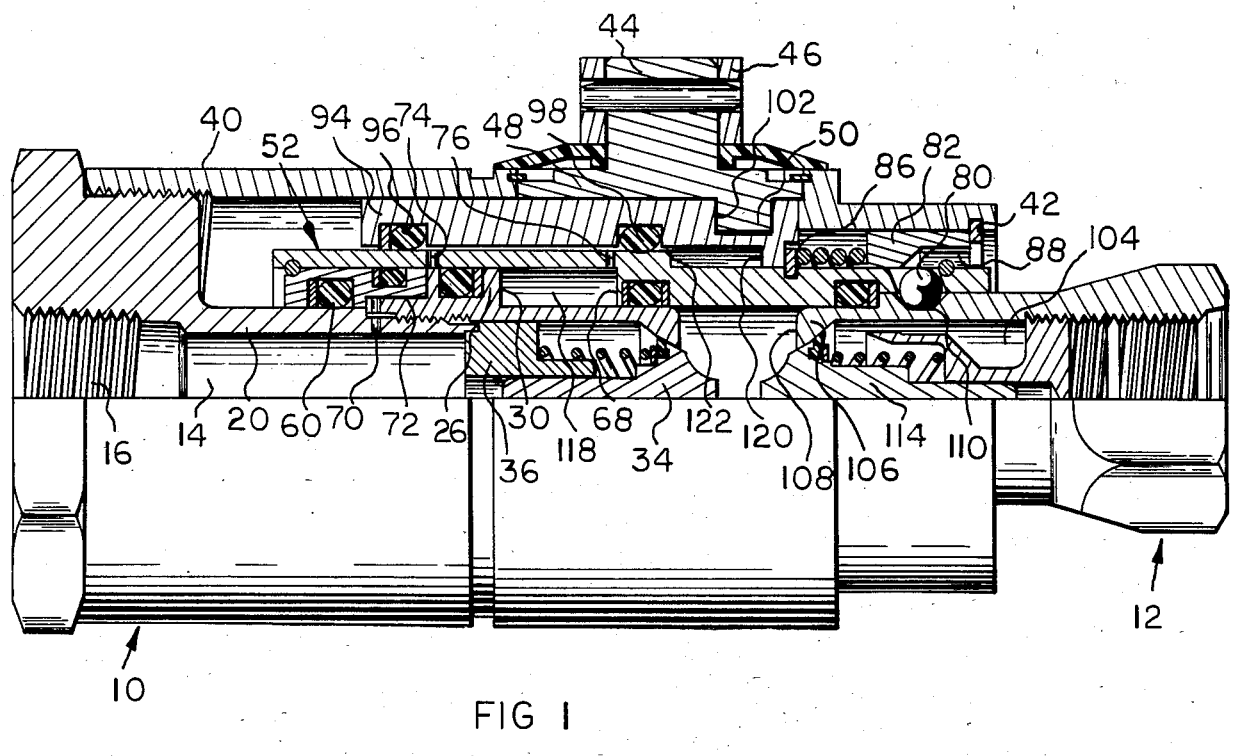
FIG. 1 is an elevational view of a coupling in accord with the invention, the upper half being shown in section, illustrating the male part inserted into the sleeve and prior to the detents being locked.

The fluid coupling in accord with the invention basically consists of a female part 10 and a male part 12. The coupling parts are each associated with a fluid system, and in the usual farm implement environment in which this type of coupling is often employed the female part 10 is attached to a pipe or rigid conduit connected to the pressurized fluid system of a tractor, not shown. The male part 12 is usually connected to the hydraulic system of an implement towed by a tractor, and in most cases the male part is attached to the end of a flexible high pressure hose, not shown.

The female part 10 includes a passage 14 which is enlarged and threaded at 16 for attachment to a pressurized fluid system, not shown. The part 10 includes an annular extension 18 threaded upon the annular projection 20, and the extension 18 includes the flat radial nose end surface 22, a valve seat 24, and a radially outwardly extending shoulder 26 is defined thereon forming radially extending shoulder faces 28 and 30, and the O-ring seal 32 is mounted within an annular groove within the shoulder.

The self-sealing poppet valve 34 is slidably supported within the passage 14 and extension 18 by spider 36, and is biased toward the end of the extension by compression spring 38 causing the elastomeric seal of valve 34 to engage seat 24 and seal passage 14. As appreciated from the drawings, the outer end of the valve 34 includes a radial abutment surface.

An annular housing 40 is threadedly affixed to the female part 10, and the housing includes an open outer end having a snap ring 42 located therein. A manual actuator 44 is rotatably mounted within the housing 40 about an axis perpendicular to the longitudinal axis of the housing and female part, and the actuator includes an operating handle 46 and a hub 48 having an inwardly extending eccentric cylindrical crank pin 50. The hub 48 is retained within a circular opening in the housing. A snap ring and an elastomeric seal is interposed between the actuator and the housing. The actuator 44, during operation, is rotated slightly less than 180° between its extreme operative positions.

An annular sleeve 52 circumscribes the female part extension 18 and projection 20, and the sleeve is of a two-piece construction. The sleeve outer portion 54 and inner portion 56 are interconnected by a drive wire 58, and the portions 54 and 56 are thereby maintained in assembly during coupling use. Appropriately located elastomer O-ring seals 60 seal the sleeve 52 to the female part, and the shoulder O-ring 32 seals against the sleeve inner diameter.

The sleeve 52 is provided with offset radial surfaces 62 and 64 in opposed axial relation to the shoulder face 28 and extension face 66, respectively, and the sleeve also includes annular radial surface 68 in axial opposed relation to the shoulder face 30. Passage 70 establishes communication between the female part passage 14 and the exterior surface 72 of the extension 18, and radial passage 74 communicates with surface 62 and the outer cylindrical diameter of the sleeve 52. Likewise, radial passage 76 communicates with the sleeve radial surface 68 and the outer diameter 78 of the sleeve.

Adjacent its open outer end the sleeve 52 includes a plurality of radial openings in each of which a ball detent 80 is mounted. A detent actuator 82 is slidably mounted upon the sleeve 52 and is biased toward the right by the compression spring 84 bearing against the sleeve mounted snap ring 86, and the detent retainer is limited in its movement toward the right by the snap ring 42, FIG. 1.

The actuator 82 includes a cam surface and recess 88, and is engagable with the wire ring 90 mounted on the sleeve which functions as a stop to limit movement of the actuator upon the sleeve. The detent actuator 82 includes an inner cylindrical surface which overlays and engages the ball detents 80 when the male part 12 is locked within the female part 10.

An O-ring 92 is internally mounted within the outer end region of the sleeve for cooperation with the male part nose, as later described.

An annular control valve 94 circumscribes the outer sleeve cylindrical surface 78 and includes spaced O-ring seals 96 and 98 which engage the outer diameter of the sleeve. The inner diameter of the valve is slightly greater than the outer diameter 78 of the sleeve wherein a radial clearance 100 exists therebetween.

The control valve 94 includes an annular groove 102 receiving the actuator pin 50 whereby rotation of the actuator will axially displace the control valve, and the right end of the control valve is recessed for receiving and abuting the sleeve ring 86.

The male part 12 includes a passage 104 and may be threaded to the end of a hydraulic hose fitting, for instance, not shown. Externally, the male fitting includes a cylindrical nose 106 terminating in a radial end surface 108, and an annular radial shoulder is formed on the nose, as is an annular detent receiving groove 110.

Internally, the part 12 includes a conical valve seat 112, and a spider within passage 104 supports the self-sealing poppet valve 114 for axial movement therein under the influence of the compression spring 116 biasing the valve toward sealing engagement with the valve seat 112.

At the beginning of a connection cycle, the components of the female part 10 will be as shown in FIG. 1. The manual actuator 44 will be rotated by handle 46 to the rotational position locating the pin 50 the maximum extent to the right toward the female part open end. This actuator position causes the valve 94 to engage the sleeve ring 86 forcing the sleeve 52 to the right causing detent actuator 82 to engage snap ring 42 compressing spring 84 as the sleeve moves to the right relative to the detent actuator radially aligning the actuator recess and cam 88 with the sleeve detent balls 80. Accordingly, the detent balls 80 may be radially displaced outwardly into recess 88 upon the insertion of the nose 106 of the male part 12 into the sleeve. The male part 12 is inserted into the open end of the sleeve until the nose shoulder engages the seal retainer of O-ring 92, and at such time the ring 92 will engage the nose 106 in fluid-tight relationship, and the detent receiving groove 110 will be in radial alignment with the balls 80. The male self-sealing valve 114 will be in the closed condition shown in FIG. 1.

When the valve 94 is to the right as shown in FIG. 1, the valve seals 96 and 98 will be so located to the sleeve 52 that the radial passages 74 and 76 are located therebetween. Pressurized fluid within female part passage 14 passes through passage 70 along the cylindrical surface 72 and outwardly along shoulder surface 28 into passage 74 and the clearance 100 between the valve 94 and sleeve 52, and through this clearance pressurized fluid passes through passage 76 into the expansible motor chamber 118 defined by shoulder surface 30, sleeve surface 68, extension 18 and the sleeve 52. As will be noted in FIG. 1, the pressurized fluid within passage 14 cannot pass through the extension as the self-sealing poppet valve 34 is in the closed condition.

Figure 2:
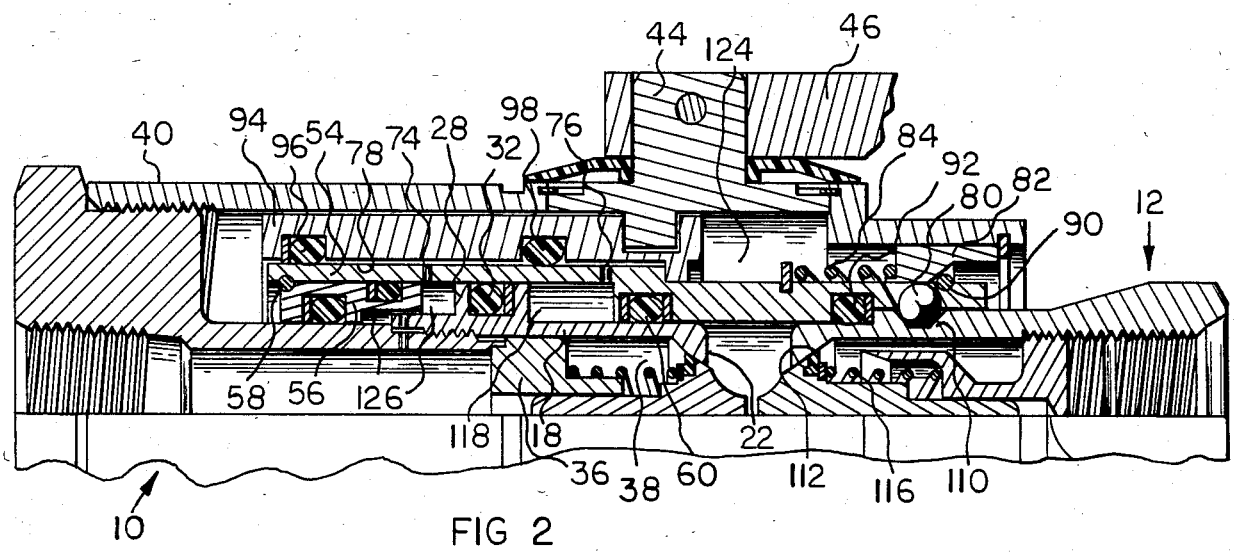
FIG. 2 is a partial, elevational, sectional view illustrating the initial stages of coupling of the parts after the detents have been locked to the male part.

After the male part 12 has been inserted into the sleeve 52 as shown in FIG. 1, the actuator 44 is rotated in a clockwise direction by handle 46 to rotate the crank pin 50 and shift the valve 94 to the left as shown in FIG. 2. This movement of the valve causes the valve shoulder 120 to engage the sleeve shoulder 122 initiating movement of the sleeve to the left and positioning the valve seal 98 to the left of radial passage 76. Movement of the seal 98 to the left of passage 76 permits the fluid within chamber 118 to flow through clearance 100 toward the right and under the valve 94 into the chamber 124. The chamber 124 is in communication with the hydraulic fluid reservoir, not shown, or a drain to the ground, and in the position shown in FIG. 2 the chamber 118 is in an exhaust condition for draining the chamber.

The relative movement of the valve 94 upon sleeve 52 causes the sleeve to move to the left relative to shoulder 26 defining chamber 126, defined by surfaces 28 and 62, and 64 and 66, and as the chamber 118 is exhausting, fluid pressure within the chamber 126 produces an expansible chamber motor biasing the sleeve 52 to the left.

As will be noted in FIG. 2, the leftward movement of the sleeve 52 has caused the ball detents 80 to radially align with the detent retainer bore holding the ball detents within the male part groove 110 producing a positive locked connection between the sleeve and the male part 12. Thus, as the sleeve 52 is moving to the left, the male part 12 is being drawn into the female part open end.

Figure 3:
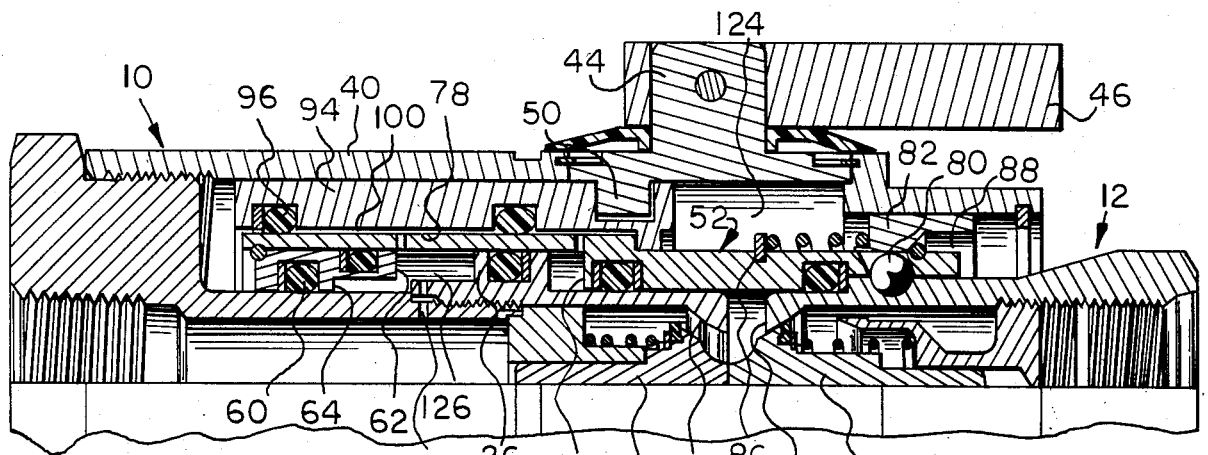
FIG. 3 is a partial, elevational, sectional view of the coupling illustrating the female part self-sealing valve in an open condition during the final stages of coupling of the parts.

FIG. 3 represents the relationship of the coupling components when the manual actuator 44 has been rotated to its full connect position and the pin 50 will be located its maximum extent to the left shifting the valve 94 fully to the left. As will be appreciated from FIG. 3 the axial dimension of the chamber 126 has increased with respect to that of FIG. 2 and the axial dimension of chamber 118 has decreased due to the movement of the sleeve 52 to the left. The chamber 118 remains in an exhaust condition, while pressurized fluid is within the chamber 126 biasing the sleeve toward the left.

FIG. 3 represents a situation wherein pressurized fluid within the male part 12 is at a greater pressure than that within female part passage 14. Thus, as the male part is drawn into the female part, the valve 114 engages the valve 34 and moves the valve 34 to the left unseating the valve 34 permitting pressurized fluid to communicate with the end 22 of the extension 18 and the end 108 of the male nose. The presence of pressurized fluid on the end 108 of the male nose produces an axial force on the male part and sleeve toward the right. However, the radial area of the pressure faces defining chamber 126 is greater than the radial area of the pressure face of the end 108 of male nose and the pressure within chamber 126 continues to draw the sleeve 52 and male part 12 to the left to the fully coupled position shown in FIG. 4.

Figure 4:
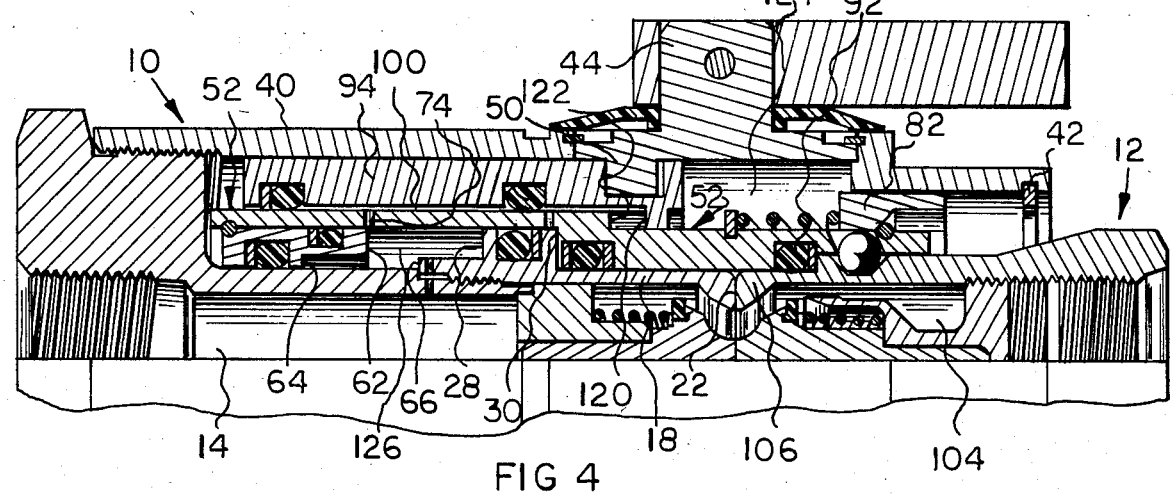
FIG. 4 is a partial, elevational, sectional view illustrating the coupling parts fully connected and in operational condition.

In FIG. 4 the surface 22 of the extension and the end 108 of the male nose are in engagement and the male valve 114 has been fully opened establishing unrestricted communication between the male and female coupling parts. Chamber 126 is at its maximum axial dimension and chamber 118 is at its minimum axial dimension as the surfaces 30 and 68 substantially engage, and passage 74 remains in communication with the chamber 124 in an exhaust condition. The fluid coupling components will be in the relationship shown in FIG. 4 during normal coupling operation.

Figure 5:
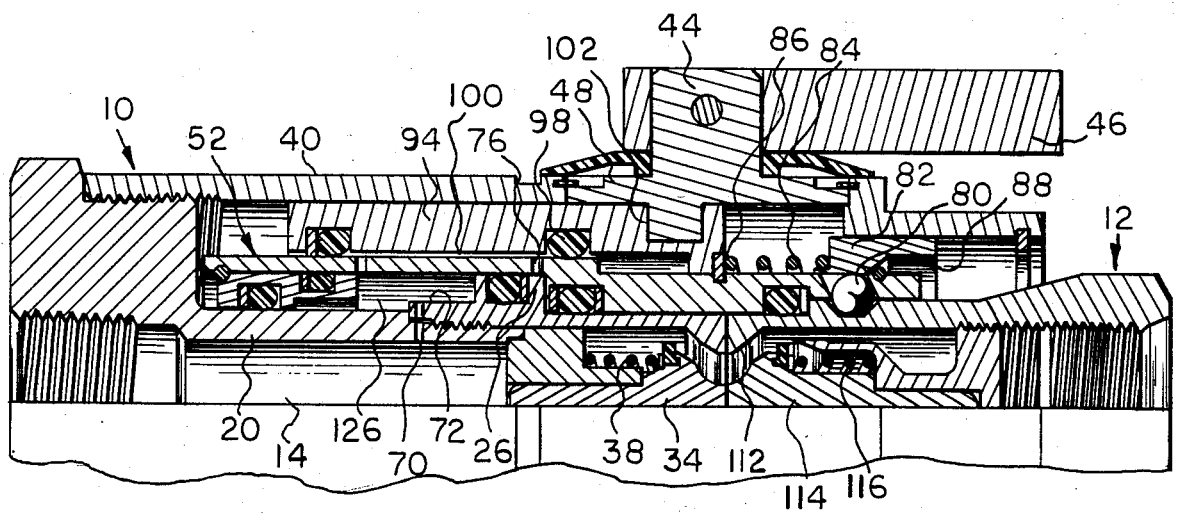
FIG. 5 is a partial, elevational, sectional view of a fluid coupling in accord with the invention illustrating the initial stage of disconnection of the parts wherein the biasing force on the sleeve has been neutralized and initial engagement between the valve and sleeve for movement of the sleeve in the disconnect direction has occurred.

When it is desired to disconnect the coupling parts the manual actuator 44 is rotated in the counterclockwise direction which begins moving the pin 50 to the right and shifts the valve 94 on the sleeve 52 as shown in FIG. 5. FIG. 5 represents the position of the components upon initial shifting of the valve on the sleeve, but prior to axial displacement of the sleeve relative to its operating position as shown in FIG. 4.

With the valve 94 as positioned in FIG. 5, the passage 76 is now located between valve seals 96 and 98 establishing communication of the chamber 126 with the chamber 118. Establishing communication of chamber 118 with the pressurized fluid within chamber 126 and passage 14 permits the chamber 118 to impose a biasing force on the sleeve 52 toward the right of a magnitude equal to the biasing force imposed upon the sleeve to the left by the chamber 126. As the effective pressure faces defining chambers 118 and 126 to produce axial sleeve movement are substantially equal in area, the biasing forces on the sleeve produced by the chambers counterbalance or neutralize each other.

As the manual actuator 44 continues rotation from the position of FIG. 5, the valve 94 is moved to the right and the valve engagement with the sleeve ring 86 will move the sleeve 52 toward the right along with the male part 12. Upon separation of the extension end 22 and male nose end 108 fluid pressure acting upon the end 108 of the male nose will aid in the sleeve movement until valve 34 closes. There is no resistance to continued rotation of the actuator 44 in the counter-clockwise direction due to the neutralizing effect of the chambers 118 and 126 and the valve 94 and sleeve 52 are moved to the right position shown in FIG. 1 wherein the detents 80 will move out from under the detent actuator 82 upon its engagement with the ring 42, and the male part being withdrawn from the sleeve open end. Upon the male part being withdrawn from the sleeve open end the female part components will be as shown in FIG. 1 in readiness for the next connection cycle.

It will therefore be appreciated that the fluid coupling of the invention requires very little manual force to rotate actuator 44, yet the power assist provided by fluid within chamber 126 permits the coupling parts to be connected even though pressurized fluid exists in one or both parts. Neutralizing the force produced by the chamber 126 on the sleeve 52 during the disconnect cycle reduces the forces necessary to disconnect the coupling parts, and fluid pressure at the nose of the male part will add a power assist during the disconnect cycle. A fluid coupling constructed in accord with the inventive concepts is relatively simple in construction as compared with prior art devices and dependable operation is achieved during all stages of the cycle.

If, when the coupling parts 10 and 12 are connected, an excessive tension is placed upon the coupling parts, the fluid coupling of the invention may function in a "breakaway" manner.

When the components are fully coupled as shown in FIG. 4, the pin 50 is not directly "on center" with respect to the coupling axis, and a tension force imposed on the coupling parts producing an axial force on the sleeve 52 greater than the biasing force produced by the fluid pressure within chamber 126 will cause the sleeve to move to the right relative to the female part 10 to position the components as shown in FIG. 1. Of course, when the sleeve 52 is pulled its maximum extent to the right the detent actuator 82 will misalign with the detents 80 permitting the detents to move out of the male part groove 110 and release the male part from the sleeve. Accordingly, the coupling parts will automatically release upon tension forces being applied thereto sufficient to overcome the power assist biasing force imposed on the sleeve.

It is to be appreciated that as the valve 94 mechanically engages the sleeve 52 at shoulders 120 and 122, and at ring 86, that a mechanical "over ride" exists between the valve and sleeve which permits coupling and uncoupling even if no fluid pressure is present in either system to aid such operations.

It is appreciated that various modifications to the inventive concepts may be apparent to those skilled in the art without departing from the spirit and scope of the invention.

I claim:

1. A manually operated power-assisted fluid coupling for interconnecting fluid systems comprising, in combination, a female part having an axial passage having an inner end connectable to a first pressurized fluid system and an open outer end, a first self-sealing valve within said passage at said outer end, a male part having an axial passage having an inner end connectable to a second fluid system and an outer end adapted to be sealingly received within said female part outer end and having an end pressure face, a second self-sealing valve within said male part passage at said outer end thereof, a tubular sleeve concentrically mounted within said female part about its passage for axial displacement in a release position to a release position and in a couple direction to a fully coupled position, said sleeve having an open end adjacent said female part outer end and sealingly receiving said male part outer end, releasable lock means defined on said sleeve adjacent its open end, lock receiving means defined upon said male part outer end receiving said lock means, a lock actuator defined on said female part selectively engaging said lock means with said lock receiving means and releasing said lock means from said lock receiving means when said sleeve is in said release position, first and second expansible chamber motors defined on said female part operatively connected to said sleeve, a first fluid circuit connecting said first motor to said first pressurized fluid system, a second fluid circuit selectively connecting said second motor to said first pressurized fluid system and exhausting said second motor, a manual actuator mounted upon said female part movable between first and second positions and in couple and release directions, a valve movably mounted on said female part operatively connected to said manual actuator and controlling fluid flow through said second fluid circuit, said valve being engagable with said sleeve upon said manual actuator moving in said release direction, said first and second manual motors having substantially equal pressure faces of larger area than that of said male part end pressure face, said first motor biasing said sleeve in said couple direction, said second motor biasing said sleeve toward said release position, said first position of said manual actuator exhausting said second motor permitting said first motor to displace said sleeve in said couple direction to said fully coupled position drawing said male part into said female part passage causing said first and second self-sealing valves to engage and open to establish communication between said passages of said female and male parts, said second position of said manual actuator pressuring said second motor by said second fluid circuit to substantially balance the effect of said motors upon said sleeve, movement of said manual actuator in said release direction engaging said valve with said sleeve to displace said sleeve to said release position.

2. In a manually operated power-assisted fluid coupling as in claim 1, said first and second expansible chamber motors comprising annular chambers each axially defined at one end by said female part and at the opposite end by said sleeve.

3. In a manually operated power-assisted fluid coupling as in claim 2, said female part including a radially extending shoulder having first and second radially disposed sides, said sleeve encircling said shoulder, seals interposed between said female part and said sleeve and said shoulder and said sleeve, said shoulder first side defining one end of said first motor chamber and said shoulder second side defining one end of said second motor chamber.

4. In a manually operated power-assisted fluid coupling as in claim 2, said first fluid circuit including a passage defined in said female part establishing communication between said female part passage and said first chamber.

5. In a manually operated power-assisted fluid coupling as in claim 4, said second fluid circuit selectively interconnecting said first chamber and second chamber.

6. In a manually operated power-assisted fluid coupling as in claim 1, said sleeve including an outer cylindrical surface, said second fluid circuit being defined by a portion of said sleeve outer cylindrical surface, said valve comprising an annular cylinder circumscribing said sleeve outer cylindrical surface axially displaceable on said sleeve, and axially spaced seals defined on said valve sealingly engaging said sleeve outer surface whereby said valve seals control flow through said second fluid circuit in accord with the axial position of said valve upon said sleeve.

7. In a manually operated power-assisted fluid coupling as in claim 6, said manual actuator comprising a hub rotatably supported on said female part, a pin eccentrically mounted upon said hub, and a cam slot defined within said valve receiving said pin whereby rotation of said hub between said first and second positions axially displaces said valve upon said sleeve.

8. In a manually operated power-assisted fluid coupling as in claim 7, an annular abutment defined on said sleeve, said valve including an end in axial alignment with said abutment, said valve end engaging said abutment to displace said sleeve to said release position.

* * * * *